May 4, 1965  V. M. SOSA  3,181,244
ADJUSTABLE CALIPER
Filed April 18, 1963  2 Sheets-Sheet 1
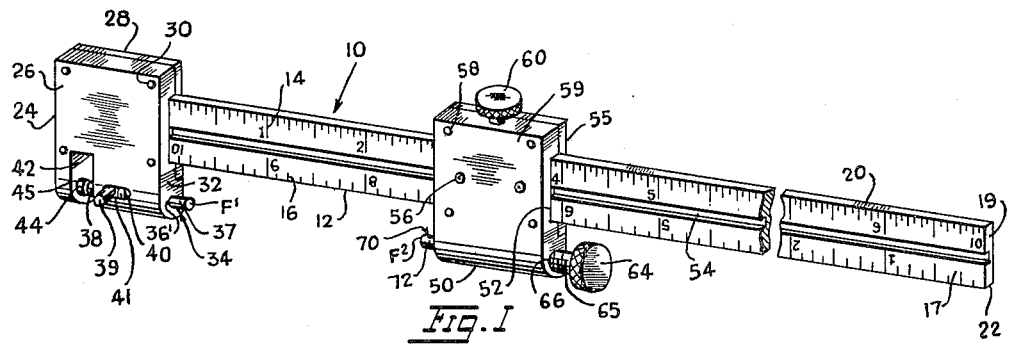
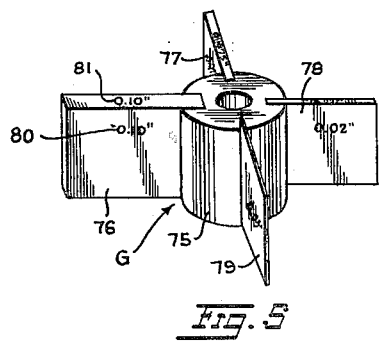
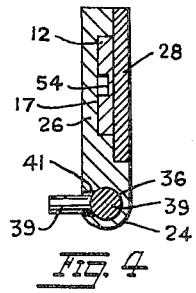
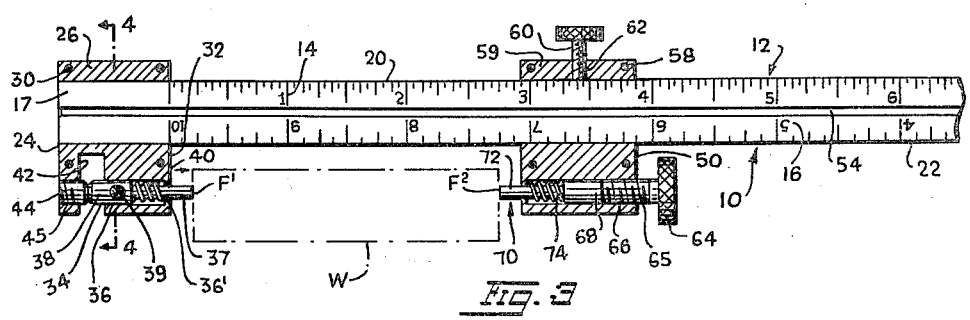
INVENTOR.
Victor M. Sosa
BY
ATTORNEY May 4, 1965 V. M. SOSA 3,181,244
ADJUSTABLE CALIPER
Filed April 18, 1963 2 Sheets-Sheet 2
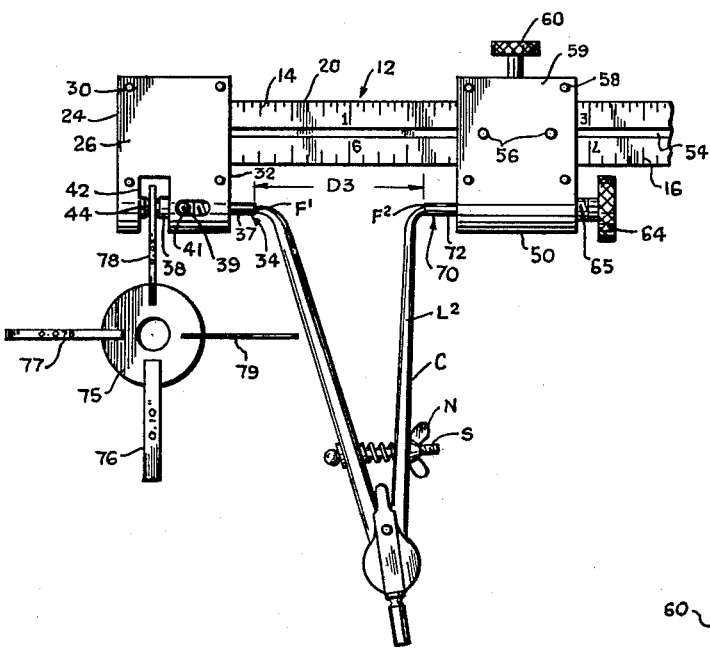
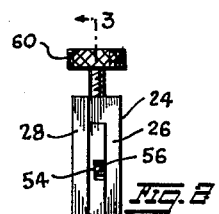
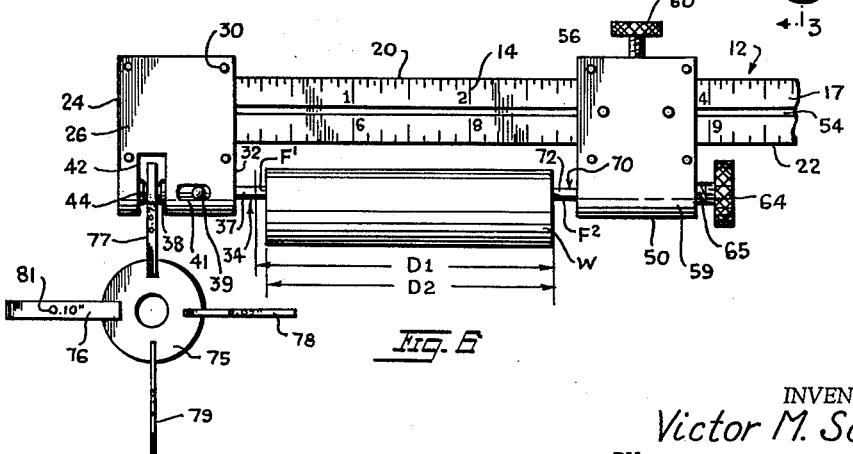
INVENTOR.
Victor M. Sosa
BY
ATTORNEY 3,181,244
ADJUSTABLE CALIPER
Victor M. Sosa, 2 Calle 0-71, Zona 1,
Guatemala, Guatemala
Filed Apr. 18, 1963, Ser. No. 273,862
9 Claims. (Cl. 33—143)

This invention concerns a caliper with work tolerance adjustment.

According to the invention there is provided a caliper rule with a fixed end block and slider block. The slider block includes an adjustable work contacting pin and the end block includes a spring loaded retractable work contacting pin. The retractable pin can be extended from the end block variable distances depending on the selected tolerance for work to be gauged by the caliper. The extent of retraction of the retractable pin sets the outside tolerance limit of the work. The caliper may be used in association with inside calipers for setting work tolerances.

It is therefore one object of the invention to provide a caliper gauge including a fixed end block and a slider block, both provided with work contacting pins, the pin in the end block being retractable and spring loaded, the pin in the slider block being adjustable by screw means.

A further object of the invention is to provide a caliper gauge of the type described, wherein the end block has a slot adapted to receive gauge plates of different thicknesses for setting the retractable pin to determine the dimensional tolerance of the work to be gauged with the caliper.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a caliper gauge embodying the invention.

FIG. 2 is an end view on an enlarged scale of the caliper gauge.

FIG. 3 is a longitudinal sectional view on a reduced scale taken on line 3—3 of FIG. 2.

FIG. 4 is a cross-sectional view on the same scale as FIG. 2 taken on line 4—4 of FIG. 3.

FIG. 5 is a perspective view of a gauge plate assembly.

FIG. 6 is a side elevational view of a portion of the caliper illustrating one way of using the caliper, according to the invention.

FIG. 7 is a side elevational view similar to FIG. 6 showing another way of employing the invention.

In FIGS. 1-4 is shown a caliper gauge 10 including a straight, flat ruler 12 marked with dimensional scales 14, 16 at opposite edges. The ruler is rectangular in cross section with flat sides 17, 19, a top edge 20 and a bottom edge 22. On one end of the ruler is secured a rectangular block 24. This head includes a base member 26 in which is fitted a side plate 28 secured by rivet pins 30 so that the block is permanently attached to the ruler. The block has an inner end face 32 from which extends shank 37 of a work contacting pin 34. This pin is slidably fitted in a bore 36 formed in the block. The bore is reduced in diameter at end 36′ at face 32. The pin has an elongated head 38 of larger diameter than the shank 37 which extends beyond face 32. Head 38 is slidably fitted in bore 36. A coil spring 40 on the shank in bore 36 tends to retract the pin axially so that the end of head 38 is exposed in a slot 42 cut across the block 24 at the bottom thereof. Axially aligned with pin 34 is another pin 44 anchored in bore 45 in the block 24. A stop lug 39 extends radially out of head 38 through a slot 41 in the side of head 24.

The caliper includes a slider block 50 which is a rectangular block having a rectangular passage 52 through which the ruler 12 extends. A groove 54 is formed in side 17 of the ruler. The slider block 50 may be provided with lateral guide pins 56 which extend into groove 54 to guide sliding movement of the slider on the ruler. The slider block may be formed with an insert plate 55 secured by rivets 58 to the base member 59 of the slider block. A thumb screw 60 is threaded in a bore 62 in the top of the slider block and serves to secure the slider block in any desired position along the ruler. An adjustment thumb screw 64 has a shank 65 threaded in a bore 66 extending parallel to the ruler. This shank bears on head 68 of a pin 70 axially aligned with pin 34. The pin 70 has a shank 72 of reduced diameter extending out of bore 66 toward pin 34. A coil spring 74 on shank 72 in bore 66 tends to retract the shank 72. This spring prevents backlash or looseness in the positioning of the pin 70 in the slider block.

FIG. 5 shows one type of gauge plate assembly G which may be used in association with the caliper. This assembly includes a cylindrical base 75. Radially extending from the base is a plurality of plates 76–79 each having a different precisely determined thickness marked on the sides and edges of the plates as indicated at 80, 81.

FIGS. 3 and 6 illustrate one way of using the gauge 10. In FIG. 3, the head 38 abuts the pin 44 and the pin 34 is retracted to its maximum extent. The slider block 50 may be moved along the ruler and locked in position by tightening screw 60 on the upper edge 20 of the ruler. The screw 64 can then be turned in a fine adjustment to determine precisely a first distance D1 between the opposing end faces F1 and F2 of the shanks 37 and 72. This may represent the maximum allowable or tolerable length of a work piece W to be gauged by the caliper.

FIG. 6 shows pin 34 extended. This is done by manually gripping lug 39 and moving pin 34 axially in bore 36. Gauge plate 77 is shown inserted between head 38 and pin 44. This determines a new distance D2 between faces F1 and F2 which is the minimum tolerable length of work piece W. By inserting various work pieces between faces F1 and F2 with any gauge plate 76–79 inserted in slot 42 and removed therefrom, it can be determined if the work piece has a length falling between the tolerable distances D1 and D2. If the work piece does not fit between the faces F1, F2 even when the gauge plate is removed, then the work piece has greater than tolerable length. If the work piece fits too loosely between faces F1, F2 when the gauge plate is inserted between head 38 and pin 44, then the piece has less than tolerable length.

FIG. 7 illustrates that the caliper can be used in association with an inside caliper C. The distance D3 may be determined as the minimum tolerable distance allowable between the ends of legs L1 and L2 of the caliper C when the gauge plate 78, for example, is inserted between head 38 and pin 44. Wing nut N on screw S of the caliper C will be adjusted to set the legs L1 and L2 to the indicated distance D3.

The invention does not interfere with other uses of the caliper 10, which can be used in usual fashion by measuring distances on scales 14, 16 between the slider block 50 and end head 24.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A caliper gauge adapted for setting minimum and maximum dimensional tolerances of a work piece, comprising an elongated straight, flat ruler, a rectangular block secured at one end of the ruler, said block having a bore therein extending parallel to the length of the ruler, said block having a slot cut across the block and extending inwardly from one edge thereof, a first pin secured in the block and extending into the slot from one end of the block, a second pin axially slidable in a bore in the block, said second pin having a head of enlarged diameter and a shank of reduced diameter, said head extending out of said bore into the slot, spring means in said bore tending to retract the pin and bias said head against the first pin, said shank extending out of the bore and disposed axially parallel to the length of the ruler, and a finger piece extending radially from the pin through a slot in said block for manually extending the shank against bias in said spring.

2. A caliper gauge adapted for setting minimum and maximum dimensional tolerances of a work piece, comprising an elongated straight, flat ruler, a rectangular block secured at one end of the ruler, said block having a bore therein extending parallel to the length of the ruler, said block having a slot cut across the block and extending inwardly from one edge thereof, a first pin secured in the block and extending into the slot from one end of the block, a second pin axially slidable in a bore in the block, said second pin having a head of enlarged diameter and a shank of reduced diameter, said head extending out of said bore into the slot, spring means in said bore tending to retract the pin and bias said head against the first pin, said shank extending out of the bore and disposed axially parallel to the length of the ruler, and a finger piece extending radially from the pin through a slot in said block for manually extending the shank against bias in said spring, another block slidably mounted on the ruler, said other block having another bore axially aligned with the first-named bore, another pin in said other bore axially aligned with the second pin, said other pin having another shank extending out of said other block and having a free end face opposing a free end face of the first-named shank, screw means in said other block adjustably determining the extent of projection of said other shank out of said other block, and further screw means carried by the said other block to disengageably set said other block in various positions on the ruler.

3. A caliper gauge adapted for setting minimum and maximum dimensional tolerances of a work piece, comprising an elongated straight, flat ruler, a rectangular block secured at one end of the ruler, said block having a bore therein extending parallel to the length of the ruler, said block having a slot cut across the block and extending inwardly from one edge thereof, a first pin secured in the block and extending into the slot from one end of the block, a second pin axially slidable in a bore in the block, said second pin having a head of enlarged diameter and a shank of reduced diameter, said head extending out of said bore into the slot, spring means in said bore tending to retract the pin and bias said head against the first pin, said shank extending out of the bore and disposed axially parallel to the length of the ruler, and a finger piece extending radially from the pin through a slot in said block for manually extending the shank against bias in said spring, another block slidably mounted on the ruler, said other block having another bore axially aligned with the first-named bore, another pin in said other bore axially aligned with the second pin, said other pin having another shank extending out of said other block and having a free end face opposing a free end face of the first-named shank, screw means in said other block adjustably determining the extent of projection of said other shank out of said other block, and further screw means carried by the said other block to disengageably set said other block in various positions on the ruler, said ruler having at least one side ruled with scales to indicate distances between the blocks.

4. A caliper gauge adapted for setting minimum and maximum dimensional tolerances of a work piece, comprising an elongated straight, flat ruler, a rectangular block secured at one end of the ruler, said block having a bore therein extending parallel to the length of the ruler, said block having a slot cut across the block and extending inwardly from one edge thereof, a first pin secured in the block and extending into the slot from one end of the block, a second pin axially slidable in a bore in the block, said second pin having a head of enlarged diameter and a shank of reduced diameter, said head extending out of said bore into the slot, spring means in said bore tending to retract the pin and bias said head against the first pin, said shank extending out of the bore and disposed axially parallel to the length of the ruler, and a finger piece extending radially from the pin through a slot in said block for manually extending the shank against bias in said spring, another block slidably mounted on the ruler, said other block having another bore axially aligned with the first-named bore, another pin in said other bore axially aligned with the second pin, said other pin having another shank extending out of said other block and having a free end face opposing a free end face of the first-named shank, and screw means in said other block adjustably determining the extent of projection of said other shank out of said other block.

5. A caliper gauge adapted for setting minimum and maximum dimensional tolerances of a work piece, comprising an elongated flat ruler, a first rectangular block secured at one end of the ruler, said block having a first bore therein, said block having a slot cut across the block and extending inwardly from one edge thereof to receive a gauge plate, a first pin axially slidable in said bore and having a head extending into said slot to engage said gauge plate, said pin having a shank extending out of the block oppositely of said head and axially parallel to said ruler, and spring means in said bore tending to retract the shank and extend said head, a second block axially slidable on the ruler, means for disengageably securing said second block in any selected position on the ruler, and a second pin carried by the second block and extending toward the first pin in axial alignment therewith.

6. A caliper gauge adapted for setting minimum and maximum dimensional tolerances of a work piece, comprising an elongated flat ruler, a first rectangular block secured at one end of the ruler, said block having a first bore therein, said block having a slot cut across the block and extending inwardly from one edge thereof to receive a gauge plate, a first pin axially slidable in said bore and having a head extending into said slot to engage said gauge plate, said pin having a shank extending out of the block oppositely of said head and axially parallel to said ruler, and spring means in said bore tending to retract the shank and extend said head, a second block axially slidable on the ruler, means for disengageably securing said second block in any selected position on the ruler, a second pin carried by the second block and extending toward the first pin in axial alignment therewith, said second pin having a shank with an end face opposing and parallel to a free end face of the shank of the first pin, and screw means for adjustably setting said second pin in the second block.

7. A caliper gauge adapted for setting minimum and maximum dimensional tolerances of a work piece, comprising an elongated flat ruler, a first rectangular block secured at one end of the ruler, said block having a first bore therein, said block having a slot cut across the block and extending inwardly from one edge thereof to receive a gauge plate, a first pin axially slidable in said bore and having a head extending into said slot to engage said gauge plate, said pin having a shank extending out of the block oppositely of said head and axially parallel to said ruler, and spring means in said bore tending to retract the shank and extend said head, a second block axially sildable on the ruler, means for disengageably securing said second block in any selected position on the ruler, and a second pin carried by the second block and extending toward the first pin in axial alignment therewith, said second pin having a shank with an end face opposing and parallel to the free end face of the shank of the first pin.

8. A caliper gauge adapted for setting minimum and maximum dimensional tolerances of a work piece, comprising an elongated flat ruler, a first rectangular block secured at one end of the ruler, said block having a first bore therein, said block having a slot cut across the block and extending inwardly from one edge thereof to receive a gauge plate, a first pin axially slidable in said bore and having a head extending into said slot to engage said gauge plate, said pin having a shank extending out of the block oppositely of said head and axially parallel to said ruler, and spring means in said bore tending to retract the shank and extend said head, a second block axially slidable on the ruler, means for disengageably securing said second block in any selected position on the ruler, and a second pin carried by the second block and extending toward the first pin in axial alignment therewith, said second pin having a shank with an end face opposing and parallel to the free end face of the shank of the first pin, and a third pin carried by the first block, said third pin being disposed in axial alignment with said first pin and extending into said slot.

9. A caliper gauge adapted for setting minimum and maximum dimensional tolerances of a work piece, comprising an elongated flat ruler, a first rectangular block secured at one end of the ruler, said block having a first bore therein, said block having a slot cut across the block and extending inwardly from one edge thereof to receive a gauge plate, a first pin axially slidable in said bore and having a head extending into said slot to engage said gauge plate, said pin having a shank extending out of the block oppositely of said head and axially parallel to said ruler, and spring means in said bore tending to retract the shank and extend said head, a second block axially slidable on the ruler, means for disengageably securing said second block in any selected position on the ruler, and a second pin carried by the second block and extending toward the first pin in axial alignment therewith, said second pin having a shank with an end face opposing and parallel to the free end face of the shank of the first pin, and a third pin carried by the first block, said third pin being disposed in axial alignment with said first pin and extending into said slot, said third pin and said head having end faces disposed in parallel opposed disposition.

No references cited.

ISAAC LISANN, *Primary Examiner.*